(12) United States Patent
Shtivelman (10) Patent No.: US 9,155,330 B1
(45) Date of Patent: Oct. 13, 2015

(54) AUTOMATED VENDING MACHINE FOR PRODUCING BEVERAGES USING COMESTIBLES

(71) Applicant: Aleksey Shtivelman, Miami, FL (US)

(72) Inventor: Aleksey Shtivelman, Miami, FL (US)

( * ) Notice: Subject to any disclaimer, the term of this patent is extended or adjusted under 35 U.S.C. 154(b) by 0 days.

(21) Appl. No.: 14/530,743

(22) Filed: Nov. 1, 2014

(51) Int. Cl.
  *A47J 31/40* (2006.01)
  *A47J 31/46* (2006.01)
  *A23L 2/04* (2006.01)
  *A47J 31/60* (2006.01)
  *A47J 43/046* (2006.01)

(52) U.S. Cl.
  CPC .. *A23L 2/04* (2013.01); *A47J 31/40* (2013.01); *A47J 31/407* (2013.01); *A47J 31/60* (2013.01); *A47J 43/046* (2013.01)

(58) Field of Classification Search
  CPC ................................. A47J 31/40; A47J 41/046
  USPC .............................. 366/141, 144, 145; 99/287
  See application file for complete search history.

(56) References Cited

U.S. PATENT DOCUMENTS

| | | | |
|---|---|---|---|
| 1,478,224 A * | 12/1923 | Hennessy et al. | 99/275 |
| 1,555,929 A * | 10/1925 | Allan | 99/509 |
| 1,764,158 A * | 6/1930 | Edwards | 99/503 |
| 1,888,528 A * | 11/1932 | Faulds | 99/502 |
| 2,274,020 A * | 2/1942 | Weightman et al. | 99/504 |
| 2,365,832 A * | 12/1944 | Monroe | 99/502 |
| 2,544,155 A * | 3/1951 | Harkenrider | 414/21 |
| 2,667,118 A * | 1/1954 | Nelson | 100/97 |
| 2,817,935 A * | 12/1957 | Fischer et al. | 53/515 |
| 3,061,281 A | 10/1962 | Phelan et al. | |
| 3,178,055 A | 4/1965 | Schuller | |
| 3,602,380 A * | 8/1971 | Spencer | 414/326 |
| 3,798,923 A | 3/1974 | Pink | |
| 4,880,142 A * | 11/1989 | Higuchi et al. | 222/56 |
| 5,188,021 A * | 2/1993 | Bushman et al. | 99/502 |
| 5,671,663 A * | 9/1997 | Alvarez Fernandez | 99/489 |
| 6,095,205 A * | 8/2000 | Nagasawa | 141/89 |
| 6,234,071 B1 * | 5/2001 | Catarain Arregui | 99/504 |
| 7,448,516 B2 | 11/2008 | Davis et al. | |
| 2005/0152215 A1 | 7/2005 | Stuart | |
| 2008/0028943 A1 * | 2/2008 | Lee | 99/282 |
| 2008/0135129 A1 * | 6/2008 | Rhee et al. | 141/83 |
| 2008/0233264 A1 * | 9/2008 | Doglioni Majer | 426/594 |
| 2012/0175010 A1 | 7/2012 | Beasley | |
| 2013/0189405 A1 * | 7/2013 | Filliol et al. | 426/231 |

FOREIGN PATENT DOCUMENTS

JP  2007080056 A  *  3/2007

* cited by examiner

*Primary Examiner* — Tony G Soohoo
(74) *Attorney, Agent, or Firm* — Andriy Lytvyn (57) ABSTRACT

A vending machine for producing beverages. The vending machine presents a user with a number of beverage options and receives the user selection. A plurality of refrigerated containers house various comestibles. An ejection mechanism is disposed within each container for expelling comestibles from the container. Control module selectively actuates the ejection mechanisms to expel comestibles required to make the user-selected beverage. The expelled comestibles slide down along a ramp into a blender pitcher. A liquid is dispensed onto the ramp facilitating movement of the comestibles. The control module actuates the blender apparatus to blend the comestibles and the liquid into a homogenous beverage. The beverage is dispensed into a cup. The ramp and the blender pitcher are automatically rinsed after preparation of each beverage.

24 Claims, 6 Drawing Sheets

AUTOMATED VENDING MACHINE FOR PRODUCING BEVERAGES USING COMESTIBLES

BACKGROUND OF THE INVENTION

1. Field of the Invention

This invention relates to vending machines. More specifically, it relates to a vending machine for producing beverages by blending comestibles with a liquid.

2. Brief Description of the Related Art

Vending machines have been around for thousands of years. It is believed that the first vending machine was created in 215 B.C. With the advent of modern technology, companies have been increasingly turning to automation to provide snacks and beverages to consumers. Lower labor costs, lower overhead, and improved user experience, have ignited the spark in vending technology. In fact, since the late 19th Century, vending machines have expanded across the world into a multi-billion dollar industry.

A myriad of various vending machines is known in the art. Most vending machines store prepackaged items—such as candy bars, soda cans, bottled water etc.—and dispose those items responsive to a user depositing funds into the vending machine and selecting an item the user wishes to purchase. Some beverage vending machines—such as the ones commonly placed in fast food restaurants—store packages of syrups, and upon a user request, combine a predetermined amount of user-selected syrup with carbonated water and dispose the resulting mixture.

Comestibles and beverages sold through vending machines are generally perceived as unhealthy, and this perception is substantiated by a plethora of factors. First, comestibles in vending machines are generally not refrigerated and, therefore, must contain preservatives to prolong their shelf life. Beverages sold through vending machines are premade and prepackaged, and generally contain artificial ingredients. The vending machine industry generates billions of dollars within the United States, yet offers few healthy choices.

As the public awareness on ill effects of poor diet increases, many consumers become reluctant to purchase food products that contain excessive sweeteners and artificial ingredients. Consequentially, the public attitude toward vending machines selling sodas and other soft drinks has been rapidly deteriorating. Conventional vending machines are becoming rejected by the general public over concerns about health ramifications of drinking soda, especially the effect that these high-sugar, highly acidic, and artificial beverages have on children. In the United States, under pressure from parents and anti-obesity advocates, many school districts moved to ban sodas, junk foods, and candy from vending machines and cafeterias.

Several healthier alternatives to conventional soda and snack vending machines are known in the art. One such machine is described and claimed in U.S. Pat. No. 2,817,935. This vending machine extracts juice from a fruit and then discharges a predetermined amount of juice into a cup, while the remainder is deposited into a waste outlet. This machine does not provide the consumer with the ability to consume the content of the whole fruit, but rather, just the juice. Further, this machine does not allow for easy cleaning after each time the juice is dispensed, or an easy way for the waste to be deposited into the sewer system.

Accordingly, there exists an unresolved need for a vending machine capable of quickly and efficiently producing fresh beverages to order from natural fruits and vegetables.

SUMMARY OF THE INVENTION

A long-felt but heretofore unfulfilled need for a vending machine capable of storing fruits and vegetables and producing a beverage therefrom is now met by a new, useful, and nonobvious invention.

The invention is a beverage vending machine that stores comestibles in dedicated containers. A refrigeration system controls the temperature within the containers to ensure an optimal storage temperature for the comestibles stored therein. Each container has an opening and an ejection mechanism that urges the comestibles stored within containers into the opening when a customer orders a beverage that requires that comestible. The ejection mechanism may be operated by an electric motor.

One or more control modules are used to actuate and deactivate various electric components of the beverage vending machine. The control module is in electrical communication with the electric motor operating the ejection mechanism and actuates the ejection mechanism to expel a predetermined amount of the comestible from the container. The control module is also in electrical communication with a blender apparatus. The blender apparatus has a blender pitcher into which the comestible is deposited after it is expelled from the container. A predetermined amount of a liquid may also be deposited into the pitcher for blending with the comestible. The control module actuates the blender apparatus for a predetermined period of time causing the blender apparatus to blend the comestible and the liquid into a beverage.

An electric valve is in fluid communication with the interior of the blender pitcher. The control module is in electrical communication with the electric valve and actuates it when the beverage is ready to be dispensed. The electric valve opens causing the beverage to flow into a cup. The customer then removes the cup from the beverage vending machine and enjoys the fresh beverage.

In an embodiment, the beverage vending machine may further include a ramp for guiding the comestible after it is ejected from the container into the blender pitcher. The liquid used for making the beverage may be dispensed from a liquid supply conduit onto the ramp, thereby reducing a coefficient of friction of the ramp to facilitate movement of the comestible along the ramp.

In an embodiment, the beverage vending machine has an electric heater configured to adjust temperature of the liquid prior to entry thereof into the blender pitcher. This feature is beneficial for warming the liquid when it is used for cleaning the ramp and the blender apparatus after preparation of the beverage.

In an embodiment, the liquid used to make blended beverages may be water. The water may be supplied into the vending machine by a municipal clean water system. The beverage vending machine may further include a reservoir containing the liquid, which can be pumped from the reservoir by a pump and delivered into the blender pitcher through the liquid supply conduit. The beverage vending machine may further include a second electric valve in electrical communication with the control module allowing the control module to regulate the flow of liquid through the liquid supply conduit.

In an embodiment, the beverage vending machine may include a conduit having an outlet within the container, thereby allowing a cleaning liquid to rinse the container.

The ejection mechanism may be an auger. The amount of comestible ejected from the container can be controlled by the angle of ration of the auger or the duration of operation of the electric motor driving the auger.

In an embodiment, the beverage vending machine may include a weight measuring device for determining the weight of the comestible remaining within the container. Data obtained by the weight measuring device may be used by the control module to determine whether the first electric motor has been operating for a sufficient amount of time to cause the ejection mechanism to expel the predetermined amount of the comestible from the container.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

Figure 1:
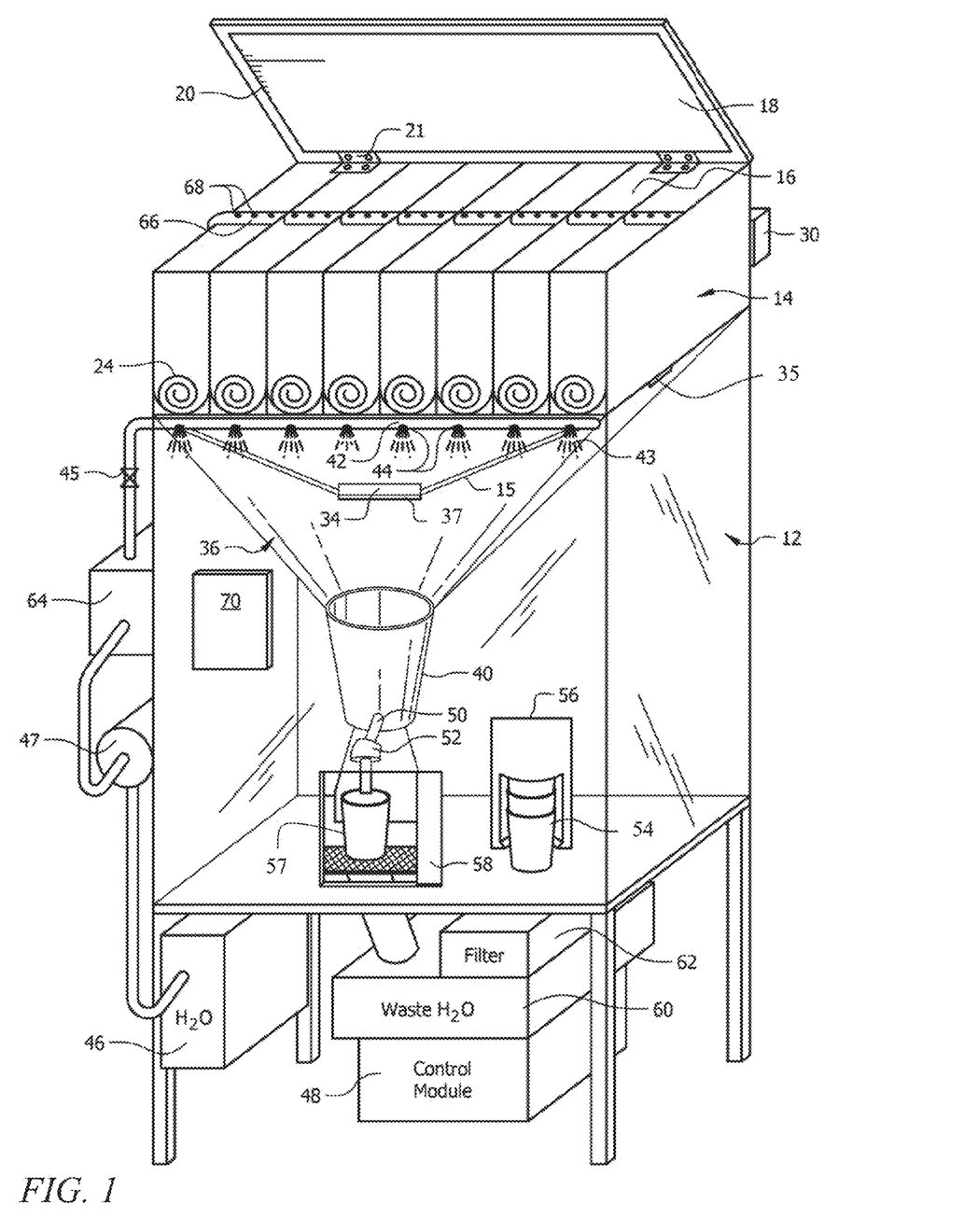
FIG. 1 is a perspective view depicting a first embodiment of the beverage vending machine.
Figure 2:
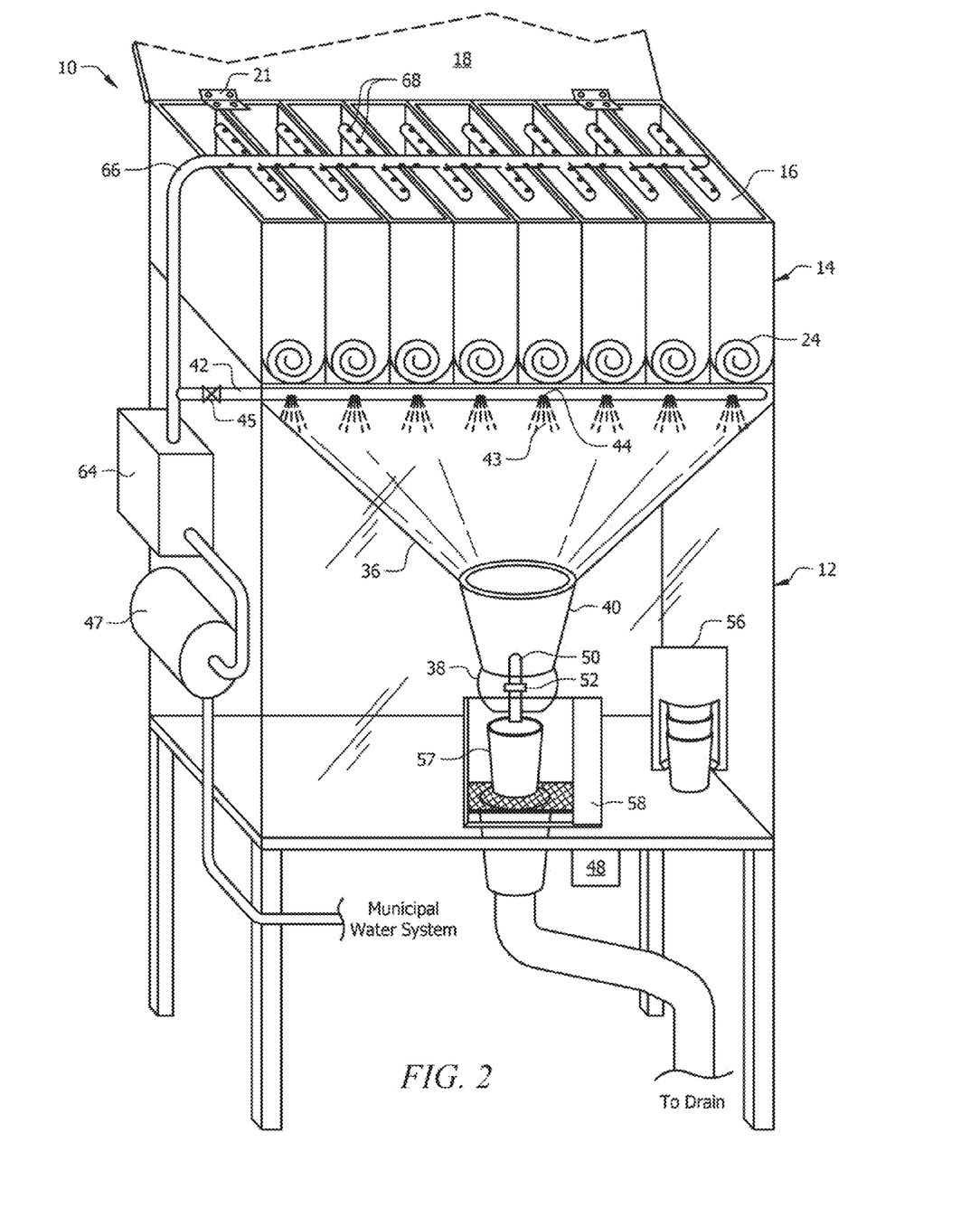
FIG. 2 is a perspective view depicting a second embodiment of the beverage vending machine.
Figure 3:
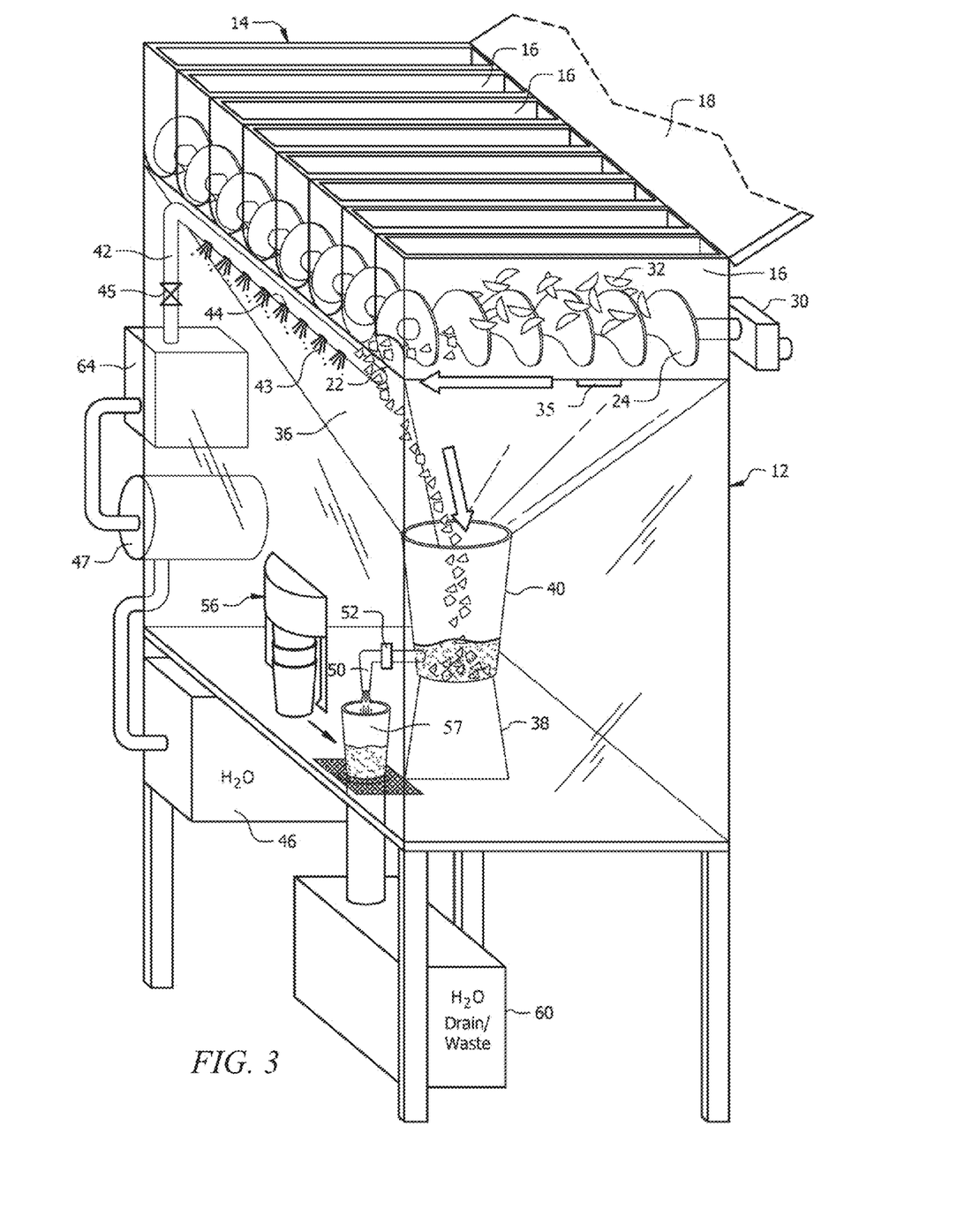
FIG. 3 is a perspective side view depicting the beverage vending machine and illustrating its operation cycle

FIGS. 1-3 illustrate a vending machine 10 according to the present invention. A freezer 14 is disposed within an upper portion of housing 12. Freezer 14 contains a plurality of containers 16 configured to house comestibles 32—for example, fruits and vegetables. Containers 16 may be removable or, in alternative, freezer 14 may be compartmentalized, thereby creating containers 16 that are integrated into freezer 14. Although this disclosure uses the term freezer, it will be understood that other refrigeration devices—even the ones incapable of producing freezing temperatures—also fall within the scope of the invention and may be used in certain embodiments. The temperature within freezer 14 may be adjusted to achieve optimal functionality of vending machine 10 and may depend on type of comestibles 32 stored within containers 16. It is foreseen that for some uses, temperature within freezer 14 may be set above 32° F.

Freezer 14 has a lid 18. In FIG. 1, lid 18 is hingedly attached to freezer 14 via hinges 21. In alternative embodiments, lid 18 may be in a sliding relationship with freezer 14. A sealing element 20 runs along the inner perimeter of lid 18. Sealing element 20 forms a fluid-impermeable seal with freezer 14 when lid 18 is closed, thereby isolating the interior of freezer 14—and containers 16 housed therein—from ambient air. This configuration enables proper temperature control within freezer 14, ensuring that comestibles 32 stored inside containers 16 do not spoil. Lid 18 can be opened to provide access to containers 16 for cleaning, maintenance, refilling, etc.

Figure 4A:
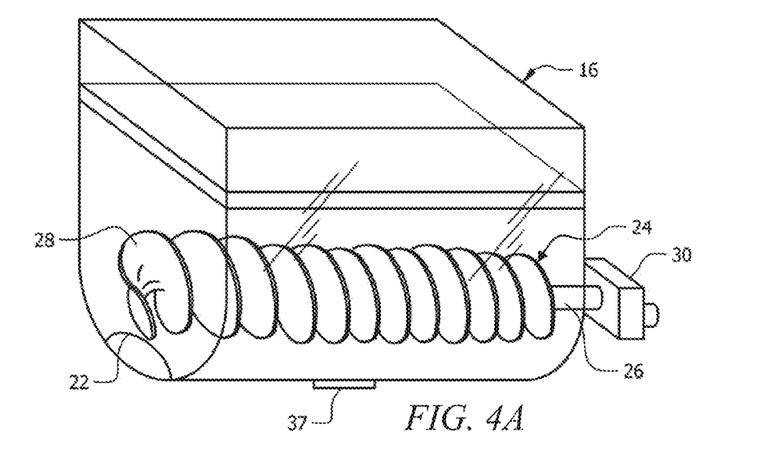
FIG. 4A is perspective view of a comestible container having an auger.
Figure 4B:
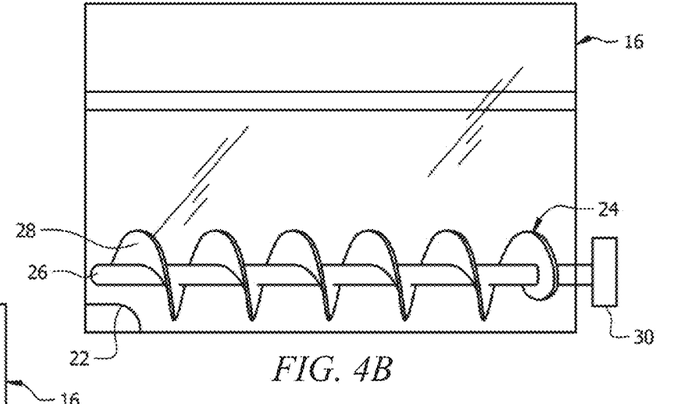
FIG. 4B is a side view of the comestible container having an auger.
Figure 4C:
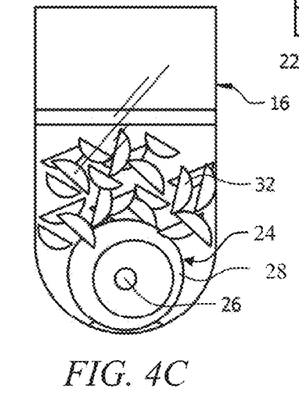
FIG. 4C is a front view of the comestible container having an auger and fill with pieces of the comestible.

As shown in FIGS. 4A-4C, each container 16 has an opening 22. Each container 16 has an ejection mechanism for expelling a predetermined amount of comestible 32 from container 16. In an embodiment, an auger 24 is rotationally disposed within each container 16. Auger 24 has a center axis 26 about which auger 24 rotates. A helical blade 28 is circumferentially disposed along the center axis 26. An electric motor 30 is in mechanical communication with auger 24 and is configured to drive auger 24 causing it to rotate about its center axis 26. As auger 24 rotates, helical blade 28 moves pieces of comestible 32 stored within container 16 toward opening 22. Helical blade 28 must be sufficiently sharp and strong to separate individual pieces of comestible 32, which may be frozen together. Electric motor 30 must be capable of producing sufficient amount of torque to continuously drive auger 24 through frozen pieces of comestible 32.

Once comestible 32 reaches opening 22, comestible 32 exits container 16 through opening 22. The amount of expelled comestible 32 can be controlled in a number of ways. For example, electric motor 30 may operate at a predetermined rotational velocity for a predetermined duration, thereby expelling a predetermined amount of comestible 32 from container 16. In alternative, electric motor 30 may drive auger 24 for a predetermined number of revolutions, which would also result in expulsion of a predetermined amount of comestible 32.

Although the foregoing description discloses an embodiment in which the ejection mechanism comprises auger 24, in alternative embodiments, auger 24 may be replaced by any of the number of ejection mechanisms known in the art for longitudinally moving contents within a container. For example, a piston may be used to push pieces of comestible 32 toward opening 22. Piston may be brought in operation via various means known in the art, including a gear configuration driven by an electric motor, hydraulic and pneumonic systems, etc. In yet another embodiment, containers 16 may be tilted to a predetermined angle for a predetermined period of time allowing gravity to expel pieces of comestible 32 from container 16 through opening 22. A variety of other means for accomplishing this functionality are known in the art and are within the scope of this invention.

In an embodiment depicted in FIG. 1, weight measuring devices 35 are disposed underneath each container 16 to continuously monitor the weight of comestibles 32 contained therein. This allows the control module 48 to calculate the weight of expelled comestible 32 by subtracting current weight of container 16 from its weight prior to expulsion of comestible 32. Once the predetermined weight of comestible 32 is expelled, the ejection mechanism is turned off Weight measuring device 35 may be a load cell, including hydraulic, pneumatic, and strain gauge load cells.

Continuing reference to FIG. 1, freezer 14 may have a slopped lower surface 15 to guide expelled pieces of comestible 32 toward a gate 34. The key functionality of gate 34 is to sealingly enclose the inner space of freezer 14. When closed, gate 34 creates a fluid-impermeable seal isolating interior of freezer 14 from the ambient environment, thereby allowing freezer 14 to maintain an internal temperature that is different from the ambient temperature. Gate 34 may be operated by a dedicated electric motor responsible for opening and closing gate 34 to allow expelled pieces of comestible 32 to exit freezer 14 and subsequently sealing freezer 14.

A second weight measuring device 37 may be positioned underneath gate 34 and may be used to determine the weight of expelled comestibles 32. After the weight of expelled comestibles 32 satisfies the predetermined weight, gate 34 opens allowing expelled comestibles 32 to exit freezer 14. In the embodiment, where individual weight measuring devices 35 are used for each container 16, second weight measuring device 37 may be superfluous.

In an alternative embodiment, a separate gate 34 may be used for each individual container 16 or a subgroup of containers 16. In the embodiment where each container 16 has its own gate 34, it is not necessary for freezer 14 to have a slopped lower surface 15. Furthermore, each gate 34 may have an associated second weight measuring device 37 to ensure that a correct amount of comestible 32 based on weight has been expelled from container 16 prior to gate 34 opening.

Vending machine 10 may further include one or more non-refrigerated containers for storing comestibles 32 that do not require refrigeration—such as nutritional supplement powders, sweeteners, nuts, dehydrated fruits and vegetables, etc. Each non-refrigerated container also has an associated ejection mechanism for expelling a predetermined amount of comestibles 32.

In an embodiment, a ramp 36 may be used to guide expelled comestibles 32 into a blender apparatus 38. After expelled comestibles 32 fall onto ramp 36, gravity forces comestibles 32 to slide down along the slope of ramp 36 into blender pitcher 40. Preferably, ramp 36 has a low coefficient of friction, thereby facilitating sliding of comestibles 32 along a surface thereof.

To further facilitate movement of comestibles 32 along ramp 36, a liquid 43 is deposited onto ramp 36 to decrease its coefficient of friction. To achieve this functionality a conduit 42 may be used. Conduit 42 is positioned over an upper portion of ramp 36 and contains a plurality of apertures 44 through which liquid 43 is deposited onto ramp 36. Liquid 43 decreases coefficient of friction of ramp 36, thereby increasing the rate at which comestibles 32 slide down ramp 36. An electric valve 45 may be positioned in conduit 42 upstream of apertures 44. Electric valve 45 controls volume of liquid 43 dispensed onto ramp 36. Electric valve 45 also controls the velocity and pressure of the flow within conduit 42. Electric valve 45 is in electrical communication with a control module 48, which controls the flow profile and amount of dispensed liquid 43 by controlling electric valve 45.

An electric heater 64 may be used to increase the temperature of liquid 43 prior to its exit from conduit 42. It may be desirable to use warm or hot liquid 43 to produce certain beverages as it may facilitate melting of comestibles 32 making them more susceptible to blending into a homogenous beverage. Electric heater 64 is in electrical communication with control module 48, thereby allowing control module 48 to adjust temperature of liquid 43 to a predetermined temperature. The predetermined temperature may depend on the type and amount of comestibles 32 being used for a particular beverage. Control module 48 may be programmed to intelligently determine an optimal temperature for liquid 43 based on amount and type of comestible 32 being dispensed. For example, control module 48 may be programmed to actuate electric heater 64 for a predetermined duration to increase the temperature of liquid 43 based on hardness and quantity of comestible 32, the temperature of comestible 32, or other parameters.

Both liquid 43 and comestible 32 move along ramp 36 and enter blender pitcher 40. One or more blades are rotationally disposed within blender pitcher and configured to blend comestibles 32 with liquid 43. Blender apparatus 38 is actuated by control module 48 for a predetermined duration sufficient to adequately blend comestibles 32 with liquid 43 producing a substantially homogeneous beverage. Blender apparatus 38 may be enclosed by a sound isolating or sound absorbing material to reduce the amount of noise from the blender apparatus 38 transmitted into the environment. A sound barrier, a sound damper, an active noise-cancelling device, or a combination may be used to soundproof vending machine 10.

In an embodiment, liquid 43 is water, and conduit 42 is connected to a municipal clean water supply as shown in FIG. 2, to a separate tank 46 as shown in FIG. 1, or both. Using municipal water reduces the cost of operation and maintenance of vending machine 10. However, if vending machine 10 is deployed at a location where a connection to a municipal water system is not readily available or too costly, vending machine 10 may use liquid 43 from a tank 46. In this embodiment, a pump 47 may be used to pump liquid 43 from tank 46 into conduit 42.

As a part of regular maintenance, tank 46 must be refilled with liquid 43 when it becomes depleted below a predetermined level. Moreover, liquid 43 within tank 46 may be a fruit juice, carbonated water, or any other liquid that can be blended with comestible 32 to produce a beverage. Multiple tanks 46 may be installed to allow for a variety of liquids 43 to be used in vending machine 10. A flow control valve may be used to selectively permit a predetermined type of liquid 43 to flow from its tank 46 to conduit 42. In some embodiments, it may desirable for some tanks 46 to contain alcoholic beverages to allow vending machine 10 to produce frozen alcoholic cocktails.

After blender apparatus 38 has operated for a predetermined period of time, control module 48 turns off blender apparatus 38. Blender pitcher 40 is in a fluid communication with a beverage dispensing conduit 50. An electric dispensing valve 52 is in a fluid communication with beverage dispensing conduit 50. Electric dispensing valve 52 is also in electrical communication with control module 48, which opens electric dispensing valve 52 after blender apparatus 38 is turned off, thereby dispensing the blended beverage.

For some beverages, the blending process may yield a fair amount of foam. A filter may be positioned within beverage dispensing conduit 50 to prevent the foam from being dispensed. The filter allows the heavier liquid to pass while retaining the lighter foam within beverage dispensing conduit 50 or blender pitcher 40.

In some embodiments, a juicer apparatus may be used in addition to, or instead of, blender apparatus 38. Juicer apparatus extracts the juice from comestibles 32 and may or may not use additional liquid 43 from tank 46 or municipal water supply. The extracted juice may be dispensed to the user or further blended with comestibles 32 to produce a beverage.

Vending machine 10 further includes a cup storage unit 54 and a cup dispensing apparatus 56. In an embodiment, cup dispensing apparatus 56 places a single cup 57 underneath the outlet of beverage dispensing conduit 50 to receive the prepared beverage from blender pitcher 40. A variety of cup dispensing apparatuses 56 are known in the art and can be employed in vending machine 10. In alternative, users may be presented with an option to use their own cups to reduce waste. A splashguard 58 is used to prevent spills. After the beverage is dispensed into cup 57, control module 48 opens splashguard 58 allowing the user to retrieve cup 57 filled with the fresh beverage.

After the beverage has been prepared, vending machine 10 runs an automated self-cleaning cycle to flush out any remaining traces of expelled comestibles 32, liquid 43, and the remains of the beverage. A predetermined volume of cleaning liquid, is sprayed onto ramp 36 from apertures 44 of conduit 42. The cleaning liquid rinses ramp 36 and enters blender pitcher 40. Blender apparatus 38 is actuated for a predetermined period of time to allow blender blades to be cleaned by the cleaning liquid. After blender apparatus 38 is turned off, control module 48 opens electric dispensing valve 52 allowing the cleaning liquid to flush dispensing conduit 50. The cleaning liquid may be discarded into a municipal waste water system as shown in FIG. 2 or into a designated waste reservoir 60 as shown in FIG. 1. Vending machine 10 may further include a filtering system 62 to process the used cleaning liquid.

The cleaning liquid may be stored in a designated tank 46. The cleaning liquid may also be water. The water for this purpose may be obtained from the municipal clean water supply or tank 46. Electric heater 64 may be used to warm up water prior to spraying it onto ramp 36. Warm water is an excellent cleaner that can melt frozen remains of comestible 32. Furthermore, water is safe for health and is an ecologically friendly solution. However, if needed, another type of a cleaning liquid can also be used.

Maintenance

Containers 16 may include weight measuring devices 35 or other type of sensors to determine amount of frozen item 32 remaining within each container 16. If control module 48 determines that the amount of frozen item 32 within any container 16 falls below a predefined minimum level, the control module 48 may send an alert to request a refill. The alert may be in a form of a visual indicator, a sound, an email, SMS, or any other means of communication known in the art. Another alert may be sent requesting maintenance if vending machine 10 runs out of cups or any liquids stored in tanks 46, or when waste reservoir 60 is nearly full.

In an embodiment where containers 16 are removable, they may be removed from freezer 14 for cleaning, maintenance, and refills. Removable containers 16 may be prefilled with comestibles at a remote location and then placed in freezer 14 to replace empty containers 16. In alternative, containers 16 may be refilled with comestibles 32 on site at the location of vending machine 10.

Periodically, it is beneficial for vending machine 10 to discard comestibles 32 and clean container 16 and other components. An invention involves an automated system for achieving this functionality, thereby reducing maintenance cost. When periodic container cleaning cycle is activated, control module 48 actuates electric motor 30. Electric motors 30 drive augers 24 for a period of time sufficient to expel all comestibles 32 from containers 16. If the amount of remaining comestibles 32 is too great to be processed by blender module 38 at once, the maintenance cycle may be performed in multiple stages, wherein a predetermined maximum amount of comestible 32 is dispensed from containers 16 at each stage.

In an embodiment, a cleaning conduit 66 is positioned within freezer 14. A cleaning liquid, which could be water, is dispensed through apertures 68 into containers 16. The cleaning liquid flushes interior of containers 16 and cleanses augers 24. The cleaning liquid then exits containers 16 through openings 22 and rinses sloped surface 15 and gate 34. Freezer 14 is turned off during the container-cleaning cycle to prevent the cleaning liquid from freezing within containers 16. It should be noted, that this automated cleaning mechanism is not necessary for the embodiment that employs removable containers 16, although it may nevertheless be advantageous.

Ramp 36, blender pitcher 40, blender apparatus 38, beverage dispensing conduit 50, and electric dispensing valve 52 are cleaned after every beverage preparation cycle as described above. However, it may be desirable to periodically run a more intense cleaning cycle or use a different cleaning liquid.

Intelligent Control Module

Figure 5:
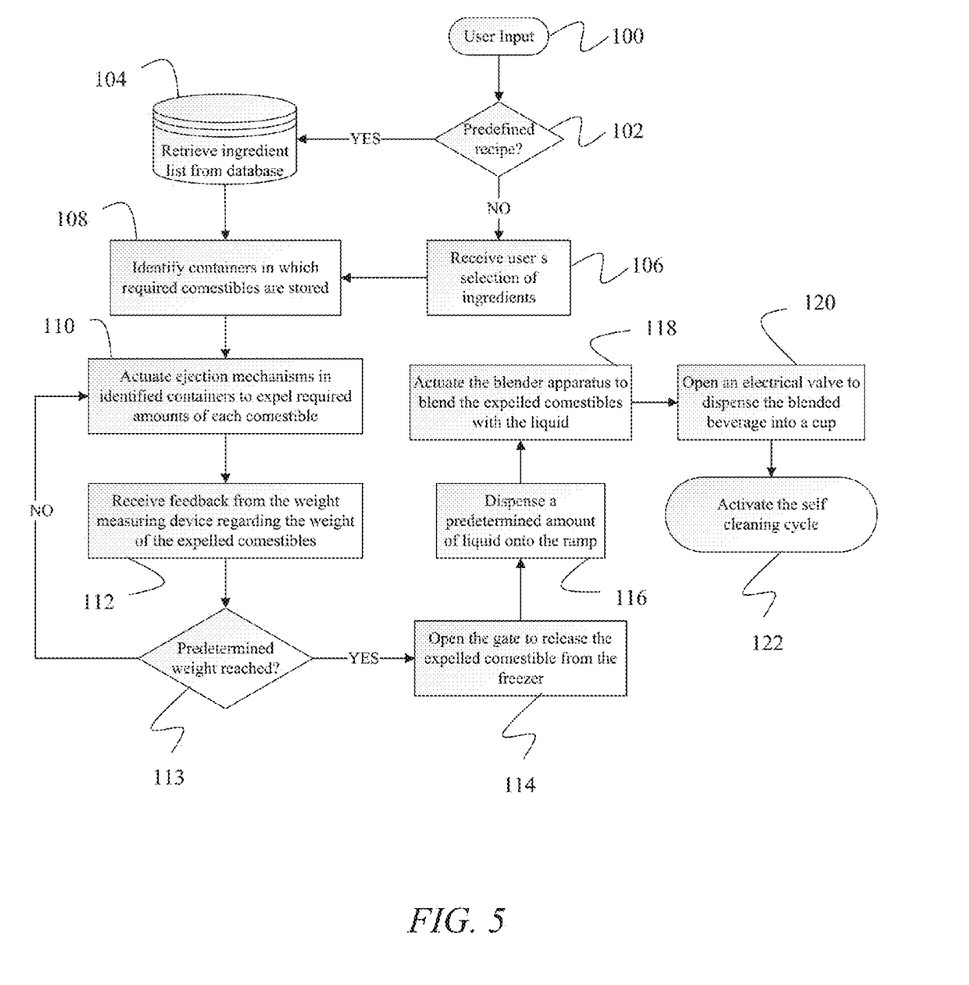
FIG. 5 is a flowchart illustrating a sequence of instructions for producing and dispensing a beverage.

Control module 48 is responsible for sequentially actuating and deactivating the electrical components of vending machine 10, thereby allowing vending machine 10 to perform its functions as shown in FIG. 5. Control module 48 may be any of a wide variety of computing devices known in the art. Control module 48 includes a processor configured to execute a set of instructions causing it to actuate or deactivate electrical components of vending machine 10. A computer readable media may be used for storing the set of instructions that are executed by the processor.

As FIG. 5 illustrates, after the user input is received in step 100, control module 48 determines whether the user input was a predefined recipe or a custom-ordered beverage in step 102. If the user selected a predefined beverage, a list of comestibles 32 and required weight of each are retrieved from a database in step 104. Otherwise, the user inputs a selection of comestibles 32 in step 106.

In step 108, containers 16 housing comestibles 32 required for the selected beverage are identified. In step 110, control module 48 actuates ejecting mechanisms associated with the identified containers 16. In the embodiment using augers 24, control module 48 actuates electric motors 30 to cause augers 24 to rotate about their center axes, thereby expelling frozen comestibles 32 from containers 16. As explained above, the auger-based expulsion mechanism may be replaced by a number of ejection mechanisms known in the art for accomplishing an objective of moving an item within a container.

In an embodiment, in step 112, weight measuring device 35 may be used to provide feedback to control module 48 regarding the weight of expelled comestible 32. In step 113, control module analyses the data received from the weight measuring device 35 to determine whether the predetermined amount of comestible 32 has been expelled. Ejection mechanism continues to operate until the predetermined amount of comestible 32 is reached. This loop ensures that the correct amount of frozen comestible 32 is used in the beverage. In step 114, after control module 48 receives a satisfactory feedback from weight measuring device 35, control module 48 sends an electrical signal to gate 34 causing it to open, thereby releasing expelled comestible 32 from freezer 14.

After comestible 32 exits freezer 14, it falls onto ramp 36. In step 116, after closing gate 34, control module 48 opens electric valve 45 and/or turns on pump 47 to cause a predetermined volume of liquid 43 to flow through conduit 42 onto ramp 36. The volume of liquid 43 dispensed onto ramp 36 is controlled by how long electric valve 45 remains open, the extent to which electric valve 45 is opened, and/or amount of pressure within conduit 42 created by pump 47. The dispensed liquid serves several purposes: it decreases coefficient of friction of ramp 36 and provides kinetic energy that facilitates movement of comestible 32 along ramp 36. Both liquid 43 and comestible 32 slide along ramp 36 into blender pitcher 40 of blender apparatus 38.

Control module 48 actuates blender apparatus 38 for a predetermined duration in step 118. Blender apparatus 38 blends comestible 32 with liquid 43 into a substantially homogenous beverage. After a predetermined duration, control module 48 turns off blender apparatus 38. In step 120, control module 48 opens electric dispensing valve 52 to dispense the beverage into a cup. In the embodiment, where the cups are pre-stored within vending machine 10, control module 48 actuates cup dispensing apparatus 56 to place a cup underneath electric dispensing valve 52 prior to dispensing the beverage. After the beverage is dispensed, control module 48 activates self-cleaning cycle in step 122.

Figure 6:
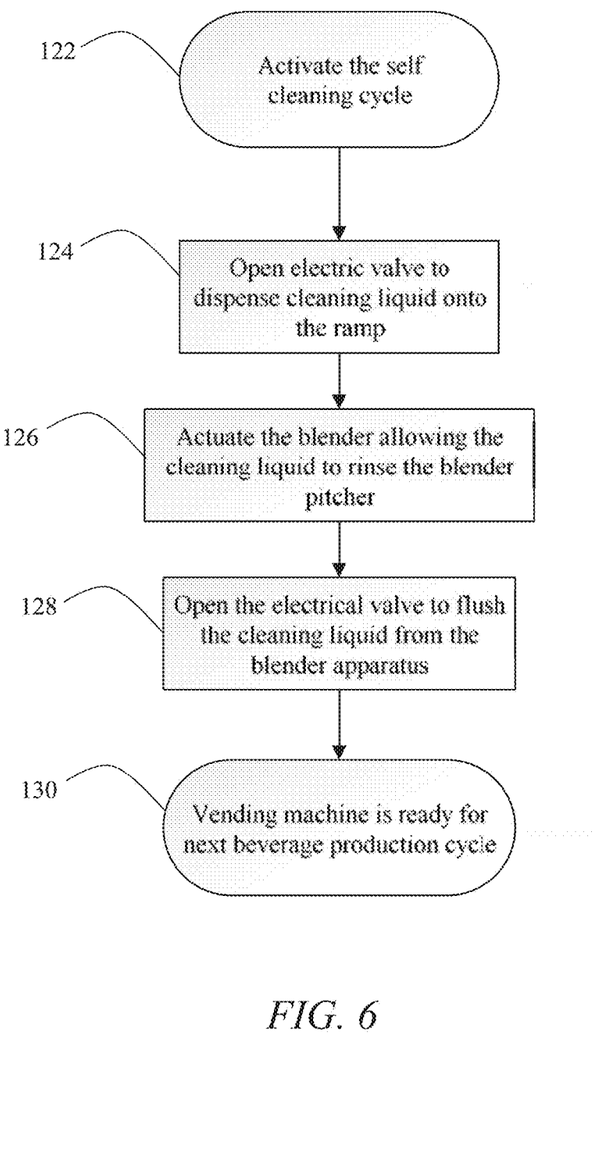
FIG. 6 is a flowchart illustrating a sequence of instructions for a self-cleaning cycle of the vending machine.

The self-cleaning cycle is schematically illustrated in FIG. 6. After the self-cleaning cycle is activated in step 122, in step 124, control module 48 opens electric valve 45 and/or turns on pump 47, thereby causing a predetermined amount of cleaning liquid to flow through conduit 42 onto ramp 36. After the cleaning liquid enters blender pitcher 40, control module 48 actuates blender apparatus 38 in step 126, thereby rinsing blender pitcher 40. In step 128, control module 48 opens electric dispensing valve 52 to discard the cleaning liquid. The cleaning liquid after the completion of the self-cleaning cycle may be deposited into municipal waste water system or stored in waste reservoir 60. At this point, in step 130, vending machine 10 is ready for the next beverage order.

User Interaction

As explained above, to initiate preparation of a beverage, control module 48 must first receive user input in step 100. A variety of input devices are known in the art and may be employed in vending machine 10 for this purpose. In the exemplary embodiment depicted in FIG. 1, a touchscreen 70 is used to present the user with a number of beverage options. The user can interact with touchscreen 70 to obtain more detailed information about beverages and their ingredients, make a selection, and submit a payment. In an alternative embodiment, a conventional item selection system requiring the user to push a button or enter an alphanumerical combination on a keypad corresponding to the user's selection may be used.

In the embodiment using integrated touchscreen 70, the graphic user interface (GUI) can be customized to adapt to the environment in which vending machine 10 is deployed. For example, a vending machine 10 that is placed at an airport may involve images of airplanes or popular tourist destinations, while vending machine 10 placed at a zoo may show images or animations of animals and plants.

Touchscreen 70 provides several beverage options for the user and requests the user to make a selection. The beverage options may be customized based on types of frozen comestibles 32 stored within vending machine 10. In the embodiment involving touchscreen 70, vending machine 10 is equipped with a computer processor operating under a set of instructions. The processor may be programmed to automatically adjust the beverage suggestions based on quantity of remaining frozen comestibles 32. For example, if one of containers 16 is low on frozen banana, then vending machine 10 may present options that do not require banana, or rearrange the beverage options so that the beverages requiring banana are presented at the end of the list. The processor may also be programmed to periodically alternate beverage options and rearrange the options list to provide customers with a dynamic menu listing an ever-changing variety of beverages. Also, a human or artificial intelligence responsible for operating vending machine 10 can monitor beverages and ingredients for popularity, and adjust the types of frozen comestibles 32 within containers 16 and beverage recipes to better satisfy the customers.

In an embodiment, a user may be presented with an option to create a profile. Vending machine 10 is equipped with a mechanism for recognizing the user profile and presenting beverage options based on user preferences and purchase history. The processor operating under preprogrammed instructions analyzes user selections, thereby allowing it to identify ingredients the user prefers or avoids. As the amount of information pertaining to user's purchases increases, the vending machine can better analyze user's behavior and preferences. Furthermore, the vending machine may also associate user's beverage purchases with a time of the day—for example, the same user may prefer a light beverage in the morning, but a more calorie rich beverage for lunch—and adapt the displayed beverage menu based on this information.

The users must authenticate themselves to have access to their personal profiles.

Authentication may be accomplished by any means known in the art including manual entry of login and password information, scanning a card equipped with a magnetic strip or a bar code, communicating with a user's personal electronic device via near field communications technology, radio frequency identification, Bluetooth® pairing, etc.

In an embodiment, vending machine 10 may be connected to a wired or wireless internet network allowing it to communicate with the users' personal electronic devices and network servers, on which various data—i.e. user profiles, ingredient lists for recipes, etc.—may be stored. Other types of communication including Bluetooth®, a direct wired connection (such as via universal serial bus), and near field communications may be used. The communication between vending machine 10 and user's personal computing device may involve receiving remote beverage orders and pushing notifications to the user including promotional materials, new beverage recipes, order history, etc. The push communications may be accomplished via any means known in the art including email, SMS, MMS, HTTP, etc. In an embodiment, the user profile may be linked to a method of payment such as a credit card, a bank account, a payment service (i.e. PayPa®, Google Wallet®, Apple Pay®, etc.) to automate the payment, thereby simplifying and expediting beverage ordering procedure.

In an embodiment, touchscreen 70 may be in a wireless communication with the processor of vending machine 10. This would allow for placement of touchscreen 70 in a location away from vending machine 10 itself. This feature may be useful in a bar setting.

Hardware and Software Infrastructure Examples

Software aspects of the present invention may be embodied on various computing platforms that perform actions responsive to software-based instructions. The following provides an antecedent basis for the information technology that may be utilized to enable the invention.

The control module may comprise a computer readable medium and a processor. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Python, Perl, Ruby or the like and conventional procedural programming languages, such as the "C" programming language or similar programming languages.

GLOSSARY OF THE CLAIM TERMS

Auger—a component of the ejection mechanism that has a center axis and a helical blade disposed along the center axis. Rotation of the auger causes the pieces of comestible positioned between its blades to move forward along a direction of the center axis.

Beverage—a non-solid solid substance intended for drinking. A beverage may be a homogenous or non-homogenous. Beverage may be a fruit juice, a nutritional supplement shake, a smoothie, an alcoholic cocktail, or a combination thereof.

Blender apparatus—an electric machine having a rotational blade for liquefying, chopping, or pureeing a comestible. Blender apparatus may be used to produce a beverage by mixing together predetermined amounts of one or more comestibles and/or liquids. The rotational blade is driven by an electric motor.

Blender pitcher—a container in which one or more comestibles and/or liquids are mixed into a beverage. A rotational blender blade is disposed within the blender pitcher.

Cleaning liquid—a substance in a liquid state intended for rinsing components of vending machine that come in contact with comestibles and liquids. Cleaning liquid may be water or another liquid capable of sufficiently rinsing necessary components.

Comestible—a non-liquid substance intended for human consumption. Some examples of comestibles include fruits, vegetables, nuts, ice, nutritional supplements, etc. Some comestibles may be frozen or refrigerated.

Container—an object having a hollow interior used for housing a comestible.

Control module—an electronic device that includes a processor for executing a set of instructions, which may be stored in a computer readable medium. The control module has a plurality of electric connections to electric components of the vending machine, thereby allowing the control module to actuate and deactivate these components when required by the instructions.

Ejection mechanism—a mechanism that causes pieces of a comestible housed within a container to move within the container toward an opening thereof.

Electric heater—a device that converts electrical energy into heat. An electric heater may include a heat exchanger to facilitate more rapid warming of the liquid passing therethrough.

Electric motor—a machine that converts electrical energy into mechanical energy.

Electric valve—an electric device for controlling flow of a fluid through a conduit.

Electric valve opens and closes in response to electric signals received from a control module.

Expel—the action of causing the pieces of a comestible to leave the container in which they are housed. Ejection mechanism is responsible for carrying out this action when instructed by the control module.

Expelled comestible—the comestible that is no longer within a container.

Liquid—a substance in a liquid state intended for human consumption. Examples of liquids include water, juice, alcohol, syrup, etc.

Liquid supply conduit—a pipe through which a liquid flows from a tank or municipal clean water system into the vending machine.

Pump—an electrical device that changes a pressure within a conduit thereby causing a liquid to flow therethrough.

Ramp—a sloped surface along which pieces of a comestible slide into the blender pitcher after they are expelled from the container Refrigeration system—a system that controls the temperature within a container thereby allowing a comestible to be stored at a temperature lower than the ambient temperature. Refrigeration system may achieve freezing temperatures or may be operated at a temperature above the freezing point (32° F.).

Tank—a vessel used for storing a liquid. Tanks may be used to store water, juices, alcohol, syrup, and other liquids.

Weight measuring device—a device that produces an electric current in response to being subjected to a force, wherein the electric current is proportional to the force. The weight measuring device may be a load cell, include hydraulic, pneumatic, and strain gauge load cells.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A beverage vending machine comprising:
a container having an opening, the container configured to house a frozen comestible;
a freezer system for controlling a temperature within the container, wherein the freezer system maintains the temperature below a freezing point;
an ejection mechanism for expelling the comestible from the container though the opening therein;
an electric motor in a mechanical communication with the ejection mechanism, whereby operation of the electrical motor causes the ejection mechanism to urge the comestible toward the opening in the container;
a control module in electrical communication with the electric motor, the control module actuating the electric motor, thereby causing the ejection mechanism to expel a predetermined amount of the frozen comestible from the container;
a blender apparatus in electrical communication with the control module, the blender apparatus having a rotational blade configured to pulverize the frozen comestible, blender apparatus further having a blending chamber configured to receive an expelled comestible and a predetermined volume of a liquid, wherein the control module actuates the blender apparatus causing the blade to rotate for a predetermined duration thereby blending the frozen comestible with the liquid to produce a beverage; and a first electric valve in a fluid communication with an interior space of the blending chamber and in electrical communication with the control module, wherein the control module causes the first electric valve to open, thereby dispensing the beverage from the blending chamber into a cup.

2. The beverage vending machine of claim 1, further comprising a ramp configured to guide the expelled frozen comestible from the container into the blending chamber.

3. The beverage vending machine of claim 2, further comprising a liquid supply conduit having a plurality of apertures, the liquid supply conduit configured to dispense the liquid onto the ramp through the apertures.

4. The beverage vending machine of claim 1, further comprising an electric heater configured to adjust temperature of the liquid prior to entry thereof into the blending chamber.

5. The beverage vending machine of claim 1, wherein the liquid is supplied by a municipal clean water system.

6. The beverage vending machine of claim 1, further comprising:
a tank containing the liquid;
a liquid supply conduit in fluid communication with the tank; and
a pump configured to cause the liquid to flow from the tank through the liquid supply conduit.

7. The beverage vending machine of claim 1, further comprising a second electric valve in electrical communication with the control module, the second electric valve controlling flow of the liquid within a liquid supply conduit.

8. The beverage vending machine of claim 1, further comprising a conduit having an outlet within the container, wherein a cleaning liquid is deposited into the container through the outlet to rinse the container.

9. The beverage vending machine of claim 1, wherein the ejection mechanism is an auger.

10. The beverage vending machine of claim 9, wherein amount of the frozen comestible expelled from the container is controlled by a predetermined angle of rotation of the auger about the center axis thereof or a predetermined duration of operation of the first electric motor.

11. The beverage vending machine of claim 1, further comprising a weight measuring device for determining a weight of the frozen comestible remaining within the container.

12. The beverage vending machine of claim 11, wherein the control module uses data from the weight measuring device to determine whether the predetermined amount of the frozen comestible has been expelled from the container.

13. The beverage vending machine of claim 1, further comprising a gate sealingly closing the opening of the container, the gate creating a fluid-impermeable seal to isolate a refrigerated space within the container from an ambient environment, wherein the gate opens to expel the frozen comestible from the container.

14. The beverage vending machine of claim 1, a sound barrier, a sound damper, an active noise-cancelling device, or a combination thereof for soundproofing the vending machine.

15. The beverage vending machine of claim 1, further comprising a second container, wherein a temperature within the second container is not controlled by the freezer system.

16. A beverage vending machine comprising:
a first container for housing a first comestible;
a second container for housing a second comestible;
a first ejection mechanism disposed within the first container, the first ejection mechanism configured to expel the first comestible from the first container;
a second ejection mechanism disposed within the second container, the second ejection mechanism configured to expel the second comestible from the second container;
a freezer system controlling internal temperatures within the first and the second containers, the internal temperatures being maintained at or below the freezing point whereby the first and second comestibles are frozen;
a control module in electrical communication with the first and the second ejection mechanism, the control module selectively actuating the first ejection mechanism, the second ejection mechanism, or both, thereby expelling a predetermined amount of the first comestible, the second comestible, or both;
a blender apparatus in electrical communication with the control module, the blender apparatus having a rotational blade configured to pulverize the first and second frozen comestibles, the blender apparatus further having a blending chamber for receiving expelled first and second comestibles and a predetermined volume of a liquid, wherein the control module actuates blender apparatus causing the blade to rotate to blend the expelled first and second comestibles with the liquid to produce a beverage; and
a first valve in a fluid communication with an interior of the blending chamber, wherein when the first valve is in an open position, the beverage is dispensed from the blending chamber into a cup.

17. The beverage vending machine of claim 16, further comprising a ramp configured to guide the expelled first and second comestibles into the blending chamber, and a conduit for dispensing the liquid onto the ramp, thereby reducing a coefficient of friction of the ramp to facilitate movement of the expelled first and second comestibles along the ramp.

18. The beverage vending machine of claim 16, wherein the liquid is supplied by a municipal clean water system or pumped from a tank.

19. The beverage vending machine of claim 16, wherein the first ejection mechanism is an auger driven by an electric motor.

20. The beverage vending machine of claim 16, further comprising a weight measuring device for determining weight of the first comestible remaining within the first container.

21. The beverage vending machine of claim 16, further comprising a gate sealingly closing a freezer space within which the first and second containers are housed, the gate configured to create a fluid-impermeable seal isolating the freezer space from an ambient environment, wherein the gate opens to dispense the expelled first and second comestibles from the refrigerated space.

22. The beverage vending machine of claim 16, further comprising a sound barrier, a sound damper, an active noise-cancelling device, or a combination thereof for soundproofing the vending machine.

23. The beverage vending machine of claim 16, further comprising a third container, wherein a temperature within the third container is not controlled by the freezer system.

24. A beverage vending machine comprising:
a first container for housing a first comestible;
a second container for housing a second comestible;
a first auger having a first center axis rotationally disposed within the first container;
a second auger having a second center axis rotationally disposed within the second container;

a refrigeration system controlling internal temperatures of the first and the second containers;

a first electric motor in mechanical communication with the first auger and a second electric motor in mechanical communication with the second auger, wherein operation of the first electric motor causes the first auger to rotate about the first center axis and operation of the second electric motor causes the second auger to rotate about the second center axis, thereby expelling a predetermined amount of the first comestible, the second comestible, or both;

a control module in electrical communication with the first and the second electric motors, the control module selectively actuating the first electric motor, the second electric motor, or both;

a weight measuring device for determining a weight of expelled first and second comestibles, wherein the control module uses measurements from the weight measuring device to determine whether the first and the second electric motors have been driving the first and the second augers for a sufficient duration to expel the predetermined amount of the first comestible, the second comestible, or both;

a blender apparatus in electrical communication with the control module, the blender apparatus having a rotational blade, blender apparatus further having a blending chamber for receiving the expelled first and second comestibles and a predetermined volume of a liquid, wherein the control module actuates blender apparatus causing the blade to rotate to blend the expelled first and second comestibles with the liquid to produce a beverage; and a first valve in a fluid communication with an interior of the blending chamber, wherein when the first valve is in an open position, the beverage is dispensed from the blending chamber into a cup.

* * * * *